United States Patent [19]

Polhemus

[11] 4,303,373
[45] Dec. 1, 1981

[54] DEVICE FOR GENERATING A CURTAIN OF HIGH VELOCITY GAS

[76] Inventor: William B. Polhemus, 240 Madrona Ave., Belvedere, Calif. 94920

[21] Appl. No.: 60,412

[22] Filed: Jul. 25, 1979

[51] Int. Cl.³ .................... F04D 29/40; A01D 41/12; A01F 12/48
[52] U.S. Cl. .................................. 415/206; 56/12.8; 415/209
[58] Field of Search ............... 56/12.8, 158, 12.9; 415/209, 210, 206, 218; 239/590, 590.5

[56] References Cited

U.S. PATENT DOCUMENTS

| | | | |
|---|---|---|---|
| 2,839,269 | 6/1958 | Gillen | 415/198.1 |
| 2,850,228 | 9/1958 | Rowley | 415/206 |
| 3,313,342 | 4/1967 | Laing | 415/209 |
| 3,796,511 | 3/1974 | Hansen | 415/206 |
| 3,828,531 | 8/1974 | Quick | 56/158 |
| 3,856,431 | 12/1974 | Tucker | 415/206 |
| 4,017,206 | 4/1977 | Doge et al. | 415/209 |

Primary Examiner—Robert A. Hafer
Attorney, Agent, or Firm—Owen, Wickersham & Erickson

[57] ABSTRACT

A blower device for producing a flat, sheet-like stream of air or gas is disclosed. An elongated, tubular body having one end closed and a slot opening along its length is supplied with air or gas under pressure at its other open end. A flat nozzle section fixed to the slot opening extends tangentially from the body. A series of twisting vanes within the body force the incoming air or gas into a spiral or helical flow pattern causing it to flow easily through the slot opening into the nozzle section. Straightening vanes are provided within the nozzle section to assure that the flow rate is substantially even along the outlet of the nozzle section. The blower device is mounted in combination with a grain or seed harvester forwardly of its cutter bar so as to blow rearwardly and prevent grain or seed from plant stalks from falling on the ground as the harvester moves along.

5 Claims, 8 Drawing Figures

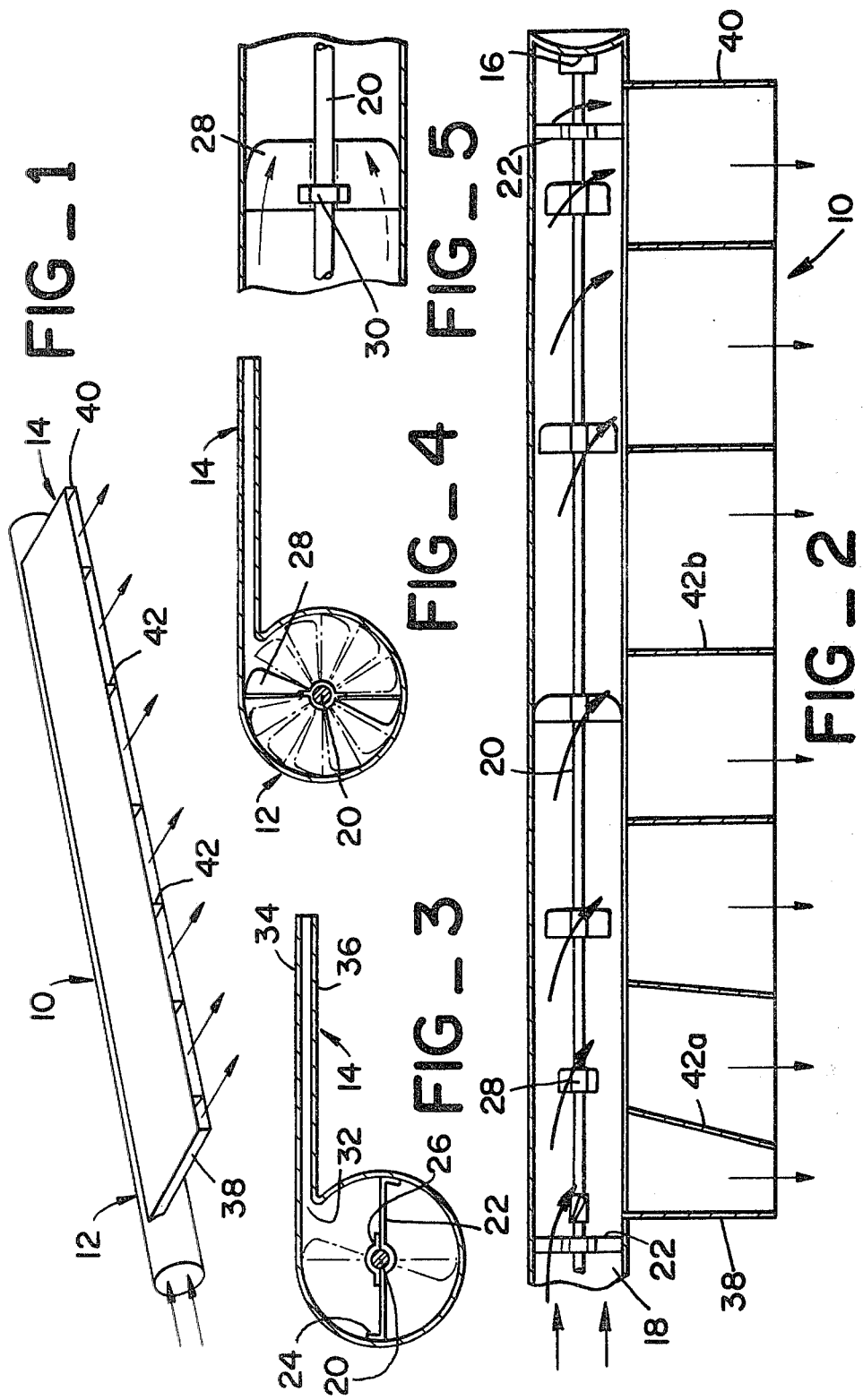

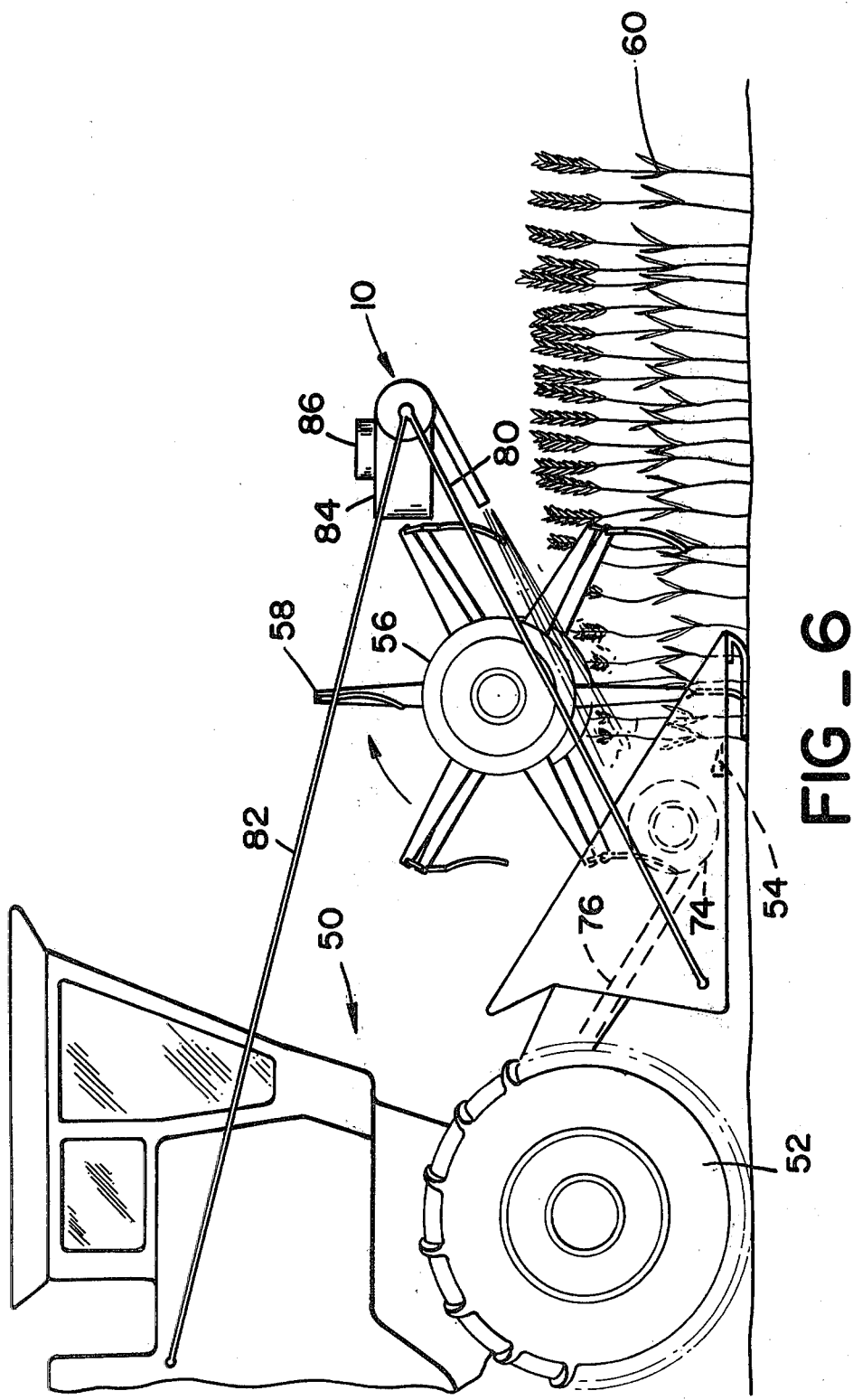
FIG_6

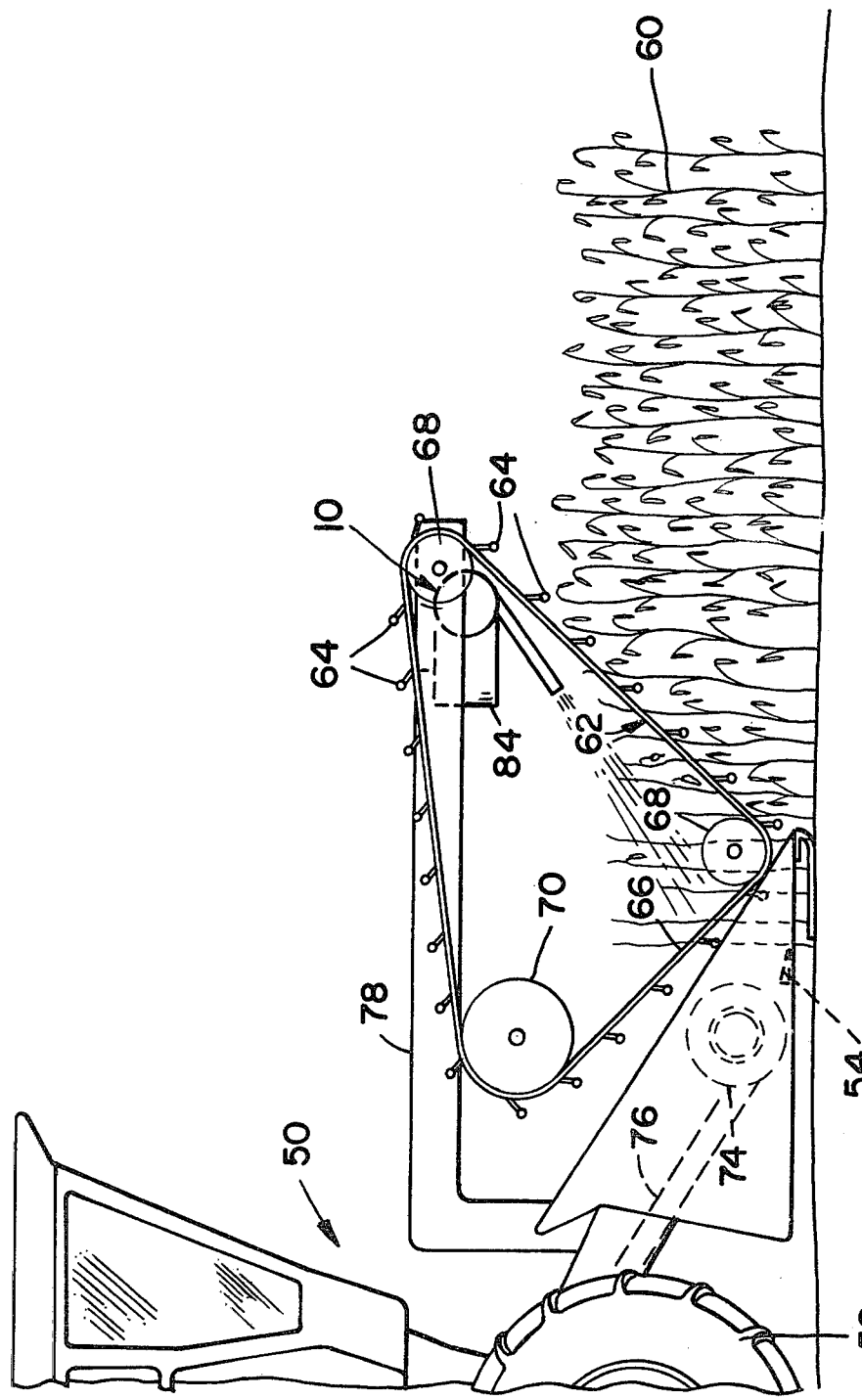

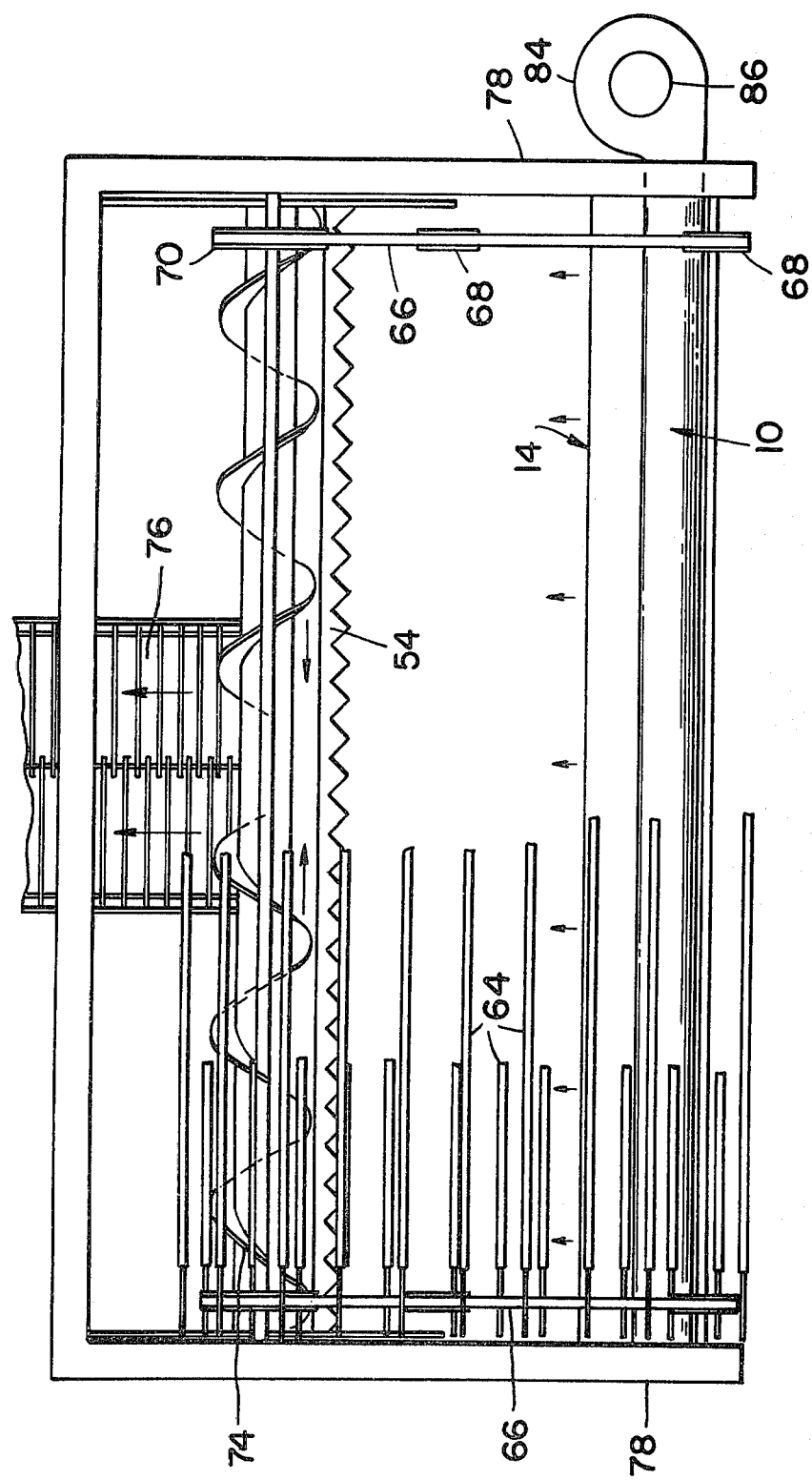
FIG_8

4,303,373

DEVICE FOR GENERATING A CURTAIN OF HIGH VELOCITY GAS

BACKGROUND OF THE INVENTION

This invention relates to a device for generating a relatively flat, thin, sheet-like stream of air. More particularly, it relates to a grain or seed crop recovery system for harvester machines which utilizes such a sheet-like airstream.

Sheets of moving gas and/or air have been used previously in various commercial and industrial applications. For example, air curtains are commonly used for busy entrances to, and exits from, refrigerated warehouses and air conditioned business or public spaces. In such systems, a "push-pull" arrangement is used with high velocity air supplied through a header and reclaimed in a larger return or suction header.

Heretofore, distribution of the supply air from the header was achieved using an input transition divergent along one axis and convergent along the other. A series of "take-offs" were used with turning vanes, graduated elbows, resistance or equalizing plates, or a combination of these. These relatively complex structures were basically brute force systems with inherent friction factors that caused substantial pressure losses. Such push-pull air curtain systems normally depended on pressure loss to equalize discharge velocities along the length of the discharge slot.

For certain applications, it is not feasible or practical to provide an air-sheet stream using the push-pull type of arrangement, particularly where space considerations for the required apparatus are critical or where it is desired to provide a relatively high velocity stream with an essentially uniform flow rate along an elongated outlet using minimum power consumption. Such a need arose in the harvesting of grain-type crops to provide the solution to the problem of saving grain or seed that might otherwise be lost. Prior to the present invention, substantial amounts of grain or seed-type crops were lost during harvesting because the grain fell to the earth as the grain stalks were first engaged by the harvester reel but before they reached the cutter bar and were moved into the grain collection system. It was discovered that a substantial amount of the grain heretofore lost could be saved by providing a high velocity air stream properly oriented to blow the grain or seeds onto the collector and thereby prevent it from falling on the ground. The blower of the present invention, in combination with a harvester machine, solves this problem.

It is, therefore, one object of the present invention to provide an improved blower device for generating a flat, sheetlike airstream.

Another object of the invention is to provide a blower device that is compact in size and yet capable of producing a relatively high velocity sheet of air or gas but with relatively low input power.

Another object of the invention is to provide a device for producing a sheet-like airstream that is highly efficient yet relatively simple in construction and, therefore, particularly well adapted for ease and economy of construction.

A more specific object of the present invention is to provide a blower device for producing a flat stream of relatively high velocity air from a tubular body which is closed at one end, by supplying the air under pressure to the other open end of the body, forcing it into a spiral flow pattern within the body, and thereafter deflecting it through a flat nozzle portion extending tangentially from the body.

Yet another object of the present invention is to provide a blower in combination with a harvester machine and mounted thereon in such a way that a substantial percentage of the grain or seed from the crop being harvested will be blown onto a recovery mechanism of the harvester and not be lost on the ground.

Another object of the present invention is to provide a flat stream air blower in combination with a harvester machine in a grain recovery system as described, wherein the blower is positioned for maximum efficiency and ease of maintenance.

SUMMARY OF THE INVENTION

In accordance with the principles of the present invention, a blower device is provided comprised of a main tubular and generally cylindrical body that is closed at one end. At its other end, the body is supplied with air from any suitable source, such as a conventional rotary, fan-type, power driven blower. Within the tubular body, the air is deflected into a spiral flow pattern by internal deflectors. The latter are mounted and spaced along the central axis of the body so that the rate of rotation of the air within the body increases as it moves down the tube. Near the closed end of the body, the air has substantially no axial component and is essentially in a full rotational flow. Fixed to the body and extending tangentially from an elongated slot along its length, is an outlet guide nozzle. This nozzle is formed by spaced apart side walls and end walls and a length that may be from two to three times the diameter of the tubular body. Within this nozzle, between its side plates, is a series of spaced apart straightening vanes which are angled with respect to the end walls where necessary to direct the air from the body into a path that is at a right angle to the longitudinal axis. The deflectors in the body, together with the straightening vanes, combine to divert the originally cylindrical mass of air entering the tube into a flat sheet of air exiting from the nozzle and with the rate of flow along the mouth of the nozzle being uniform.

When utilized in combination with a harvester machine, the sheet-stream blower is mounted forwardly of the crop positioning belt, or reel, and transverse to the harvester's direction of travel. As the harvester moves forward at its normal speed, the sheet of air exiting from the blower nozzle is directed toward a grain catching area on the harvester just rearwardly of its cutting blade. Thus, any grain, seeds or other crop particles, such as beans, that start to fall as the plant stalks are engaged by the harvester reel or belt, are entrained in the sheet stream of air and blown onto the catching-recovery area from whence they are moved in the usual manner to the harvester storage compartment.

Other objects, advantages and features of the invention will become apparent from the following detailed description which is presented in conjunction with the accompanying drawings.

BRIEF DESCRIPTION OF THE DRAWING

FIG. 1 is a view in perspective of a sheet-stream blower embodying the principles of the present invention;

FIG. 2 is an enlarged plan view in section of the blower of FIG. 1, showing internal vanes;

FIG. 3 is a somewhat larger view in elevation of the inlet end of the blower of FIG. 1;

FIG. 4 is a view in cross-section of the blower body showing the internal arrangement of turning vanes;

FIG. 5 is a fragmentary view in side elevation and in section of the blower of FIG. 1, showing one of the turning vanes within the blower body;

FIG. 6 is a partially schematic view in side elevation showing a sheet-stream blower according to the invention as it appears when installed on a typical reel type harvester;

FIG. 7 is a fragmentary and partially schematic view in elevation showing a blower according to the invention, installed on the front end of a somewhat modified form of harvester.

FIG. 8 is a plan view of the front of the harvester shown in FIG. 7.

DETAILED DESCRIPTION OF THE EMBODIMENT

With reference to the drawing, FIGS. 1 and 2 show a sheet-stream blower 10 embodying principles of the present invention with arrows indicating the inlet and outlet flow patterns as well as flow within the device. In general, it comprises a tubular cylindrical body section 12 with a flat, elongated nozzle section 14 extending tangentially from one side of the body and terminating at a long narrow outlet that extends parallel to the longitudinal axis of the body section. The latter may be fabricated from a relatively thin-walled sheet metal material, and at one end it is closed by a fixed end wall 16. Its opposite or inlet end 18 is connected to a suitable source of pressured air such a conventional rotary air pump or fan (not shown). This conventional source of air pressure may be attached directly to the inlet end 18 or it may be located remotely, with its input piped into the blower 10, as indicated by the inlet arrows.

Extending longitudinally within the tubular body, is an elongated rod 20 which, as shown in FIG. 1, is held in place coincident with the longitudinal axis of the body. This rod is supported in its axial position by two or more transverse brackets 22 located near opposite ends of the tubular body. As shown in FIG. 3, each of these brackets has an end flange 24 that may be attached, as by riveting or welding, to the inner wall of the body and a central boss 26 for holding the rod.

Attached to the rod 16 at spaced apart intervals, is a series of deflecting vanes 28 that cause the incoming air to move progressively into a spiral or helical path. As shown in FIG. 2, these vanes are somewhat closer together near the inlet end of the body in order to cause the desired initial spiral deflection of the air mass as it moves along in the body. Essentially, each vane 28, which is held to the central rod 20 by a bracket 30, is made from a flat piece of sheetmetal that extends longitudinally within the tubular body and has upper and lower portions that are bent about 30° in opposite directions. As indicated by the dotted lines in FIG. 4, the vanes 28 are also preferably located on the rod at different angular positions relative to each other so as to enhance and increase the spiral turning rate of the air that flows into the blower as a cylindrical column at one end and exits as an air sheet at the outlet from the flat nozzle. Thus, as shown, each vane 28 is located at a small angle (e.g. 15°) on the rod relative to its next adjacent vane, so that an overall corkscrew type of flow pattern is created. Also, to provide the increasing spiral flow pattern with greater efficiency as air proceeds down the blower body, the leading edge of the vanes 28 should preferably be greater on the vanes that are located farther from the inlet.

The cylindrical wall of the blower body has an elongated slot 32 near its top which extends along a line parallel to the axis of the body. This slot forms an opening to the flat nozzle 14 which extends tangentially from the top side of the body. The nozzle is formed from parallel, spaced apart, upper and lower wall members 34, 36 and narrow end wall members 38 and 40. Fixed within the nozzle, as by welding, is a series of straightening vanes 42 that extend between the upper and lower wall members. The purpose of these latter vanes is to deflect the air flowing outwardly through the body slot so that within the nozzle it will assume a vector that is perpendicular to the longitudinal body axis. Also, the straightening vanes are spaced apart and oriented as to cause an even distribution of air flow along the outlet of the nozzle. Thus, as indicated in FIG. 2, the straightening vane 42a, located nearest to the inlet end of the tubular body, actually angles back toward the end wall 38 of the nozzle. This is because the air exiting from the body slot at this point has a relatively large longitudinal component which must be compensated by the straightening vane. Further down the body slot, the straightening vanes form less of an angle relative to the end walls because the air progressively has a reduced longitudinal component as it nears the closed end of the body. Near the center of the nozzle, the straightening vanes, such as vane 42b, are essentially parallel to the end walls. The overall result of the aforesaid blower configuration as described, (for air moving up to the rate of 10,000 ft/min) is that the air exits from the nozzle 14 in narrow sheet-like stream having substantially the same flow rate along its entire opening.

Thus, the blower 10, according to the invention, provides a flat stream of air that can be used for various purposes, such as an air curtain or a sheet-type blower.

With reference to FIGS. 6 and 8 of the drawing, a sheet-stream blower 10 is shown as it appears when installed for use in combination with a grain or seed harvester 50. As shown in FIG. 6, the harvester may be self powered and mounted on large wheels 52 to move over the ground at a predetermined speed depending on the type of crop and existing conditions. On typical machines for harvesting grain or soy beans, a transverse cutter bar 54 is mounted on suitable supporting structure at its forward end fairly close (e.g. 6 inches) from the ground level. Forward of the cutter bar is a rotating reel 56 of the well known type comprised of circumferentially spaced apart paddles 58, which contact and hold the crop stalks 60 against the cutter as the harvester moves forward. In lieu of a standard reel, a belt-like crop control device 62 with transverse crop engaging members 64 may be used, as shown schematically in FIG. 7, to accomplish essentially the same function. The device 62 has end chains 66 supported on idlers 68 and driven by sprockets 70, connected to the power source (not shown). Directly rearward of the cutter bar is a suitable catching means for receiving and conveying the cut crop, such as a transverse auger 74. As shown in FIG. 8, this auger moves the crop material toward the center of the machine where it is fed onto another conveyor 76 and into the harvester's conventional separation apparatus (not shown).

When such harvesters are in operation, the crop engaging reel 56, or its equivalent belt-type device 62, engage the crop stalks out in front of the harvester as the cutter bar 54 approaches it. Heretofore, at this point, a substantial amount of crop material, such as grain or soy beans, may fall from the tops of the stalks and onto the ground in front of the cutter bar and thus be lost and unharvested. Previously, the problem was particularly severe when the crop was somewhat dry and over ripe so that the grain quickly separated from the stalks when vibrated by the reel or belt paddles.

Now, in accordance with the invention, the sheet-stream blower 10 is fixed to the harvester at a position forwardly and above the cutter bar 54. On the reel type harvester shown in FIG. 6, the blower may be supported in a suitable manner, such as by a pair of forwardly extending struts 80, on the harvester chassis and additional guy wires 82. On the belt type harvester of FIGS. 7 and 8, the blower 10 may be supported by forwardly extending frame members 78. For a compact, simple installation, the inlet end of the blower may be connected directly to its own air pressure source, such as a rotary fan 84, driven by a suitable auxillary engine or moter 86. In both installations, the blower extends transversely at the front of the harvester, spaced forwardly from and parallel to the cutter bar 54 and also, forwardly of the reel or belt. The flat nozzle section 14 of the blower projects at an angle generally rearwardly and downwardly towards the crop receiving means 74. As shown in FIGS. 6 and 7, when positioned forwardly of the reel or belt, the nozzle axis and the air exiting from it, should normally make an angle of approximately 25° with the ground level.

In FIG. 6, a portion of a reel-type machine is shown harvesting a grain crop, such as wheat, and in FIG. 7, the alternate form of machine is shown harvesting soy beans. In both cases, the operation of the blower is essentially the same. The sheet stream of air from the blower nozzle impinges on the crop being harvested at about the level where the grain or beans are located on their stalks. The blower 10 is mounted by suitable means so that the direction of the air stream can be adjusted. Thus, instead of falling to the ground, the grain and beans are blown across the cutter bar and onto a receiving means such as the auger conveyor 74 rearward of the cutter bar. Very little, if any, grain or seeds are able to fall to the ground. From the receiving means, the captured grain or seeds are conveyed with the other crop material to the harvester's separator and storage section of the machine.

An additional advantage provided by the invention, is that it enables the harvester speed to be increased under many variable crop conditions where, heretofore, the speed was necessarily limited in order to minimize crop losses. Thus, not only can a higher percentage of the crop be harvested but the harvesting operation can be accomplished in less time and at less cost.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A blower device for producing a relatively wide but thin stream of air comprising:
   an elongated, hollow body having an end wall closure at one end, an open inlet at its other end and an elongated slot opening extending longitudinally between said ends;
   means for forcing a constant flow of air into said open inlet of said body;
   a flat, relatively narrow nozzle section covering said slot, fixed to and extending tangentially from one side of said body;
   an air deflecting means within said body for causing air to flow into a helical pattern before passing through said slot opening, said air deflecting means comprising a series of fixed, spaced apart, twisting vanes within said body for deflecting the axially flowing air into a spiral flow pattern;
   straightening means in said nozzle section for causing air flowing from said slot opening to flow from the outlet of said nozzle section along a line perpendicular to the longitudinal axis of said body at a substantially even flow rate along said outlet of the nozzle section.

2. The blower device as described in claim 1, including a rod supported within said body coincident with its longitudinal axis; and bracket means for securing each of said twisting vanes to said rod at preselected, spaced apart intervals.

3. The blower device as described in claim 1, wherein each of said twisting vanes is a piece of sheet metal bent in different directions at its opposite ends.

4. The blower device as described in claim 2, wherein each of said twisting vanes is angularly displaced on said rod from its nearest adjacent twisting vane.

5. The blower device as described in claim 2, where said twisting vanes are closer together on said rod nearer said body inlet.

* * * * *